(12) United States Patent
Willis et al.

(10) Patent No.: US 7,113,229 B2
(45) Date of Patent: Sep. 26, 2006

(54) DIGITAL CRYSTAL VIDEO RECEIVER

(75) Inventors: Michael J. Willis, Powder Springs, GA (US); Michael L. McGuire, Snellville, GA (US); Charlie W. Clark, Robins AFB, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 525 days.

(21) Appl. No.: 10/322,261

(22) Filed: Dec. 17, 2002

(65) Prior Publication Data

US 2004/0114056 A1   Jun. 17, 2004

(51) Int. Cl.
*H04N 5/44* (2006.01)

(52) U.S. Cl. ...................... 348/725; 348/572

(58) Field of Classification Search ............... 348/725, 348/728, 572, 731; 341/126, 155; 375/316, 375/243; H04N 5/44, 5/455
See application file for complete search history.

(56) References Cited

U.S. PATENT DOCUMENTS

| 5,048,059 | A | * | 9/1991 | Dent .......................... 375/340 |
| 5,519,437 | A | * | 5/1996 | Nelvig ........................ 348/162 |
| 5,528,296 | A | * | 6/1996 | Gove et al. ................. 348/275 |
| 5,533,064 | A |   | 7/1996 | Ichihara |
| 5,995,168 | A |   | 11/1999 | Yagi |
| 6,313,874 | B1 | * | 11/2001 | Bowyer et al. ............. 348/731 |
| 6,600,788 | B1 | * | 7/2003 | Dick et al. .................. 375/245 |
| 6,654,633 | B1 | * | 11/2003 | Stengel et al. ............. 600/544 |
| 6,844,788 | B1 | * | 1/2005 | Chadwick ................... 375/295 |

* cited by examiner

*Primary Examiner*—Sherrie Hsia
(74) *Attorney, Agent, or Firm*—Thomas, Kayden, Horstemeyer & Risley LLP

(57) ABSTRACT

Disclosed are systems and methods for determining the logarithmic transfer function of a plurality of analog signals using digital circuitry components. The apparatus is a digital crystal video receiver that includes an analog-to-digital converter and a programmable logic component that determines the logarithmic transfer function of plurality of signals. The programmable logic component may include a FPGA, microprocessor, macroprocessor, combinations of discrete logic components, etc. The programmable logic component includes memory having one of a look-up table and an instruction set that enables the programmable logic component to process or calculate a signal that is logarithmically proportional to the plurality of signals. The method for determining the logarithmic transfer function of a plurality of analog signals comprises converting the plurality of analog signals to a plurality digital signals and determining the logarithmic transfer function of the plurality of analog signals via a programmable logic component.

17 Claims, 9 Drawing Sheets

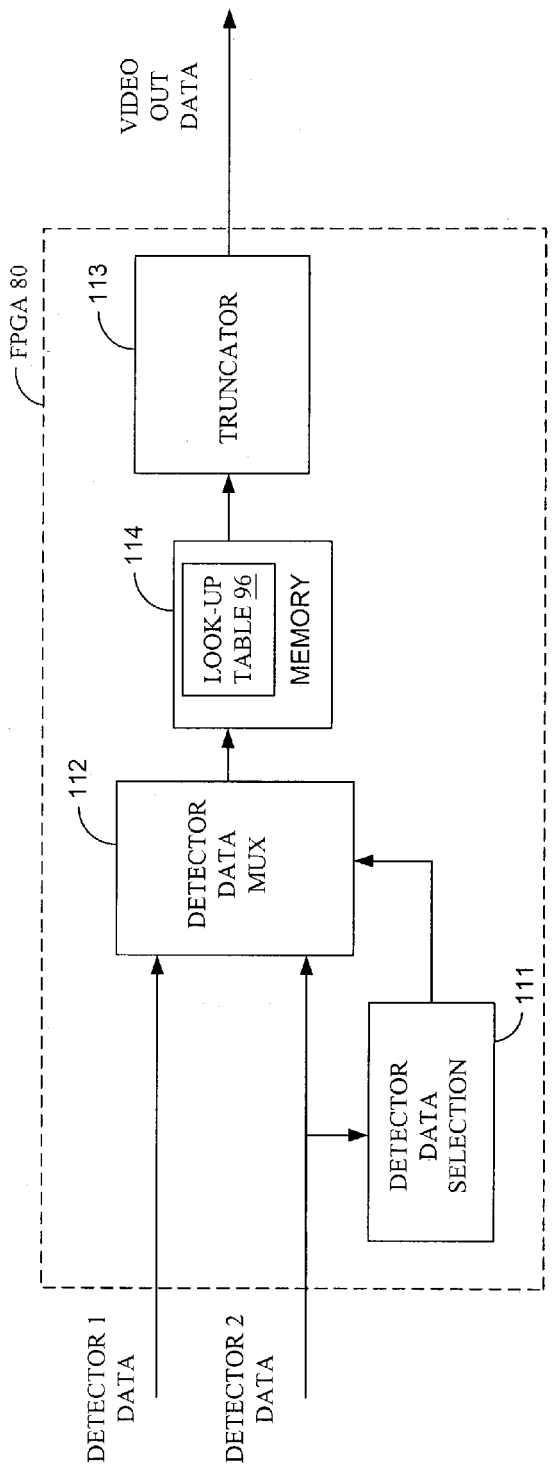
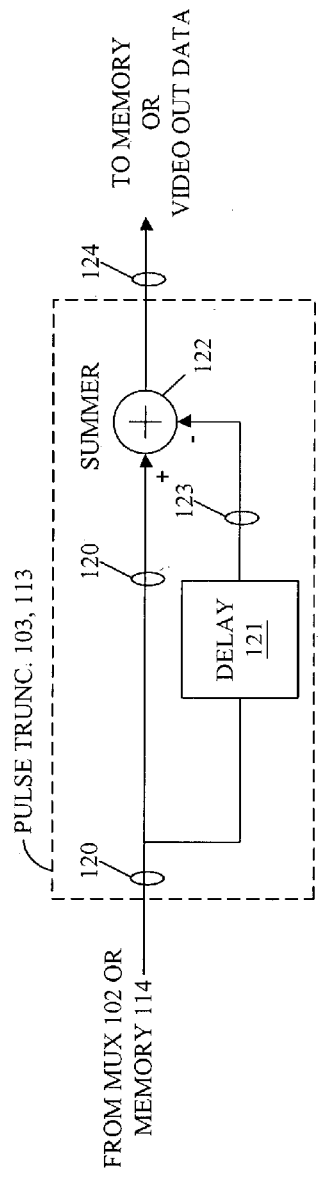

DIGITAL CRYSTAL VIDEO RECEIVER

STATEMENT REGARDING FEDERALLY SPONSORED RESEARCH OR DEVELOPMENT

This invention was made with Government support under F09603-95-G-0008-0019 awarded by the Air Force of the United States. The Government has certain rights in the invention.

TECHNICAL FIELD

The present invention is generally related to receivers, and, more particularly, to an apparatus and method for a digital crystal video receiver.

DESCRIPTION OF THE RELATED ART

Typically, log video amplifiers (LVA) have been used in the industry to implement a compressive transfer function, generally known as a logarithmic transfer function. The LVA produces an output signal that is logarithmically proportional to a radio frequency signal applied at an input port of the amplifier. The LVA is a single channel device, as indicated in FIG. 1, that is operable over a limited range of input signal amplitudes.

To expand the dynamic range of the single channel log video amplifier, an extended range LVA was configured using a pair of radio frequency detectors coupled in parallel. For example, as shown in FIG. 2, detector 1 may sense input signal having a first range of input signal power and detector 2 may sense input signals having a second range of input signal power. By using detector 1 to sense input signals having a first range of input signal power and detector 2 to sense input signals having a second range of input signal power above the first range, the extended range LVA can produce a composite amplified output signal having an amplitude proportional to the logarithm of the input signal power over both input signal power ranges. Unfortunately, due to the nature and characteristics of the analog circuit components in the extended range LVA, a non-linear crossover region 32 occurs at the transition between the logarithmically amplified input signal sensed by detector 1 and the logarithmically amplified input signal sensed by detector 2, as shown in FIG. 3. The non-linearity of the composite device is undesirable in many applications.

The crossover region 32 of FIG. 3 can be minimized using various techniques. For example, careful arrangement of the analog components and electromagnetic shielding on a printed circuit board (PCB) can reduce coupling between the analog components. As a result indicated in the function of FIG. 4, crossover region 42 may more closely approach an ideal linear response. Unfortunately, in order for the extended range log video amplifier to approach the linear response as shown in FIG. 4, the extended range log video amplifier becomes very expensive.

Thus, a heretofore unaddressed need exists in the industry to address the aforementioned deficiencies.

SUMMARY OF THE DISCLOSURE

Disclosed are systems and methods for determining the logarithmic transfer function of plurality of signals using digital circuitry components. In one embodiment, a digital crystal video receiver includes an analog-to-digital converter and a programmable logic component that determines the logarithmic transfer function of the plurality of signals.

In one embodiment, a method for determining the logarithmic transfer function of a plurality of analog signals using digital circuitry components includes converting the plurality of analog signals to a plurality of digital signals and determining the logarithmic transfer function of the plurality of analog signals via a programmable logic component.

BRIEF DESCRIPTION OF THE DRAWINGS

Many aspects of the invention can be better understood with reference to the attached drawings. The components in the drawings are not necessarily to scale, emphasis instead being placed upon clearly illustrating the apparatus and method of the digital crystal video receiver (DCVR).

FIG. 11 is an example of an alternative embodiment of the field programmable gate array of FIG. 8.

FIG. 12 is a block diagram illustrating an embodiment of the truncator of FIGS. 10 and 11.

DETAILED DESCRIPTION

Disclosed herein are systems and methods through which a receiver implements a logarithmic transfer function through digital circuit technologies. In particular, the receiver is implemented by digitizing an analog signal generated by detectors and determines the logarithmic transfer function of the signal using digital circuit technologies. Example systems are described with reference to the figures. Although the systems are described in detail, they are provided for purposes of illustration only and various modifications are feasible. After the example systems have been described, examples of operation of the systems are provided to explain the manners in which the receiver can implement a logarithmic transfer function through digital circuit technologies.

Figure 1:
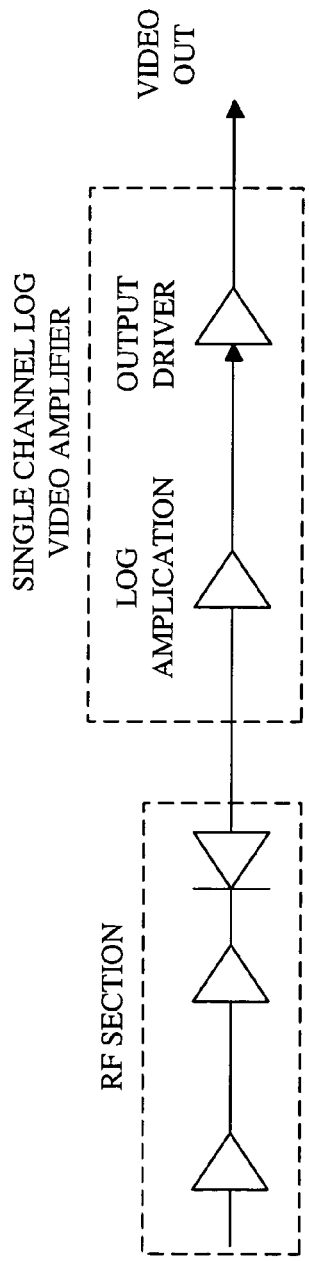
FIG. 1 illustrates an embodiment of a single channel log video amplifier.
Figure 2:
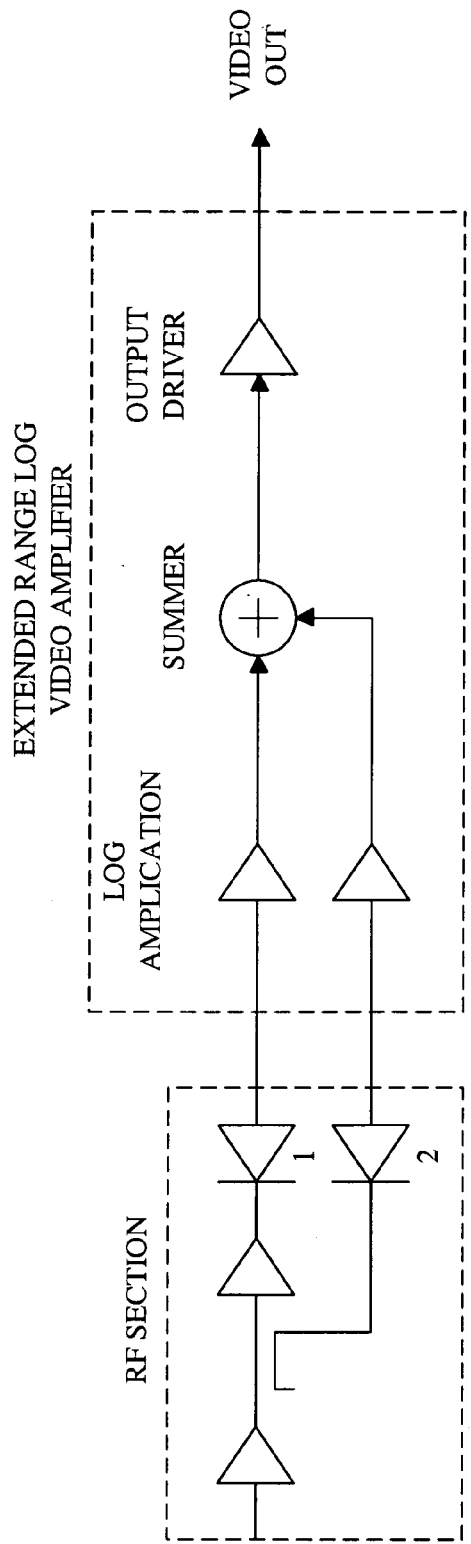
FIG. 2 illustrates an embodiment of an extended range log video amplifier.
Figure 3:
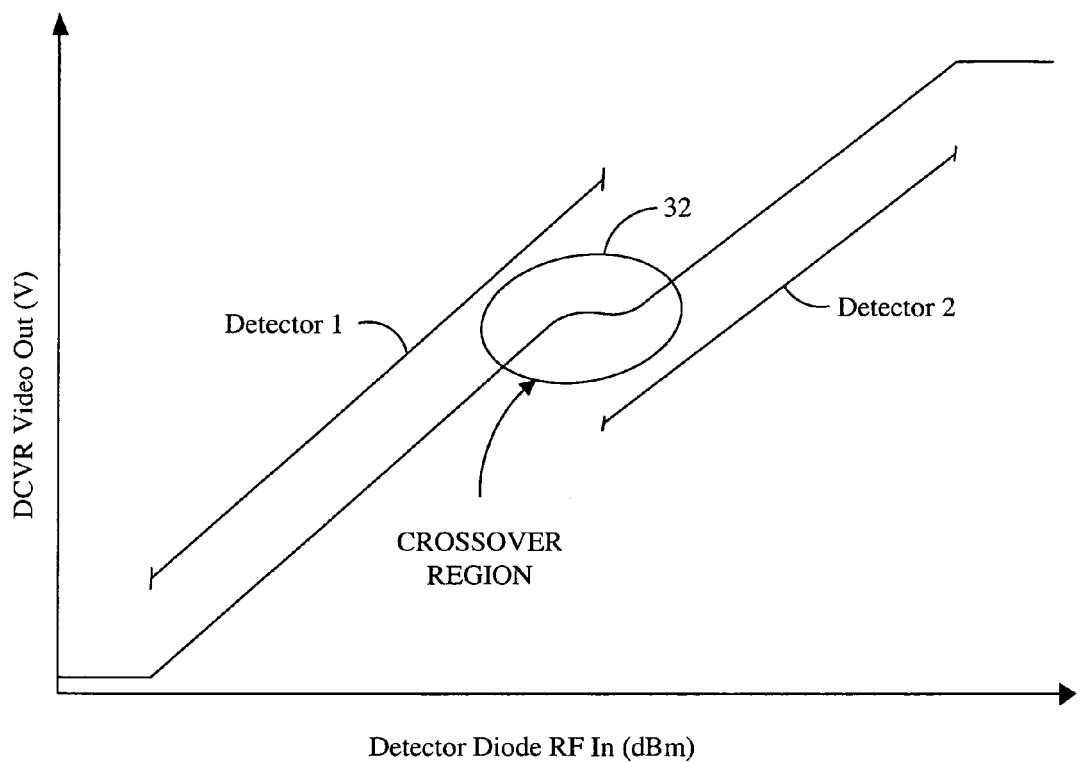
FIG. 3 is a graph illustrating the crossover region of the extended range LVA.
Figure 4:
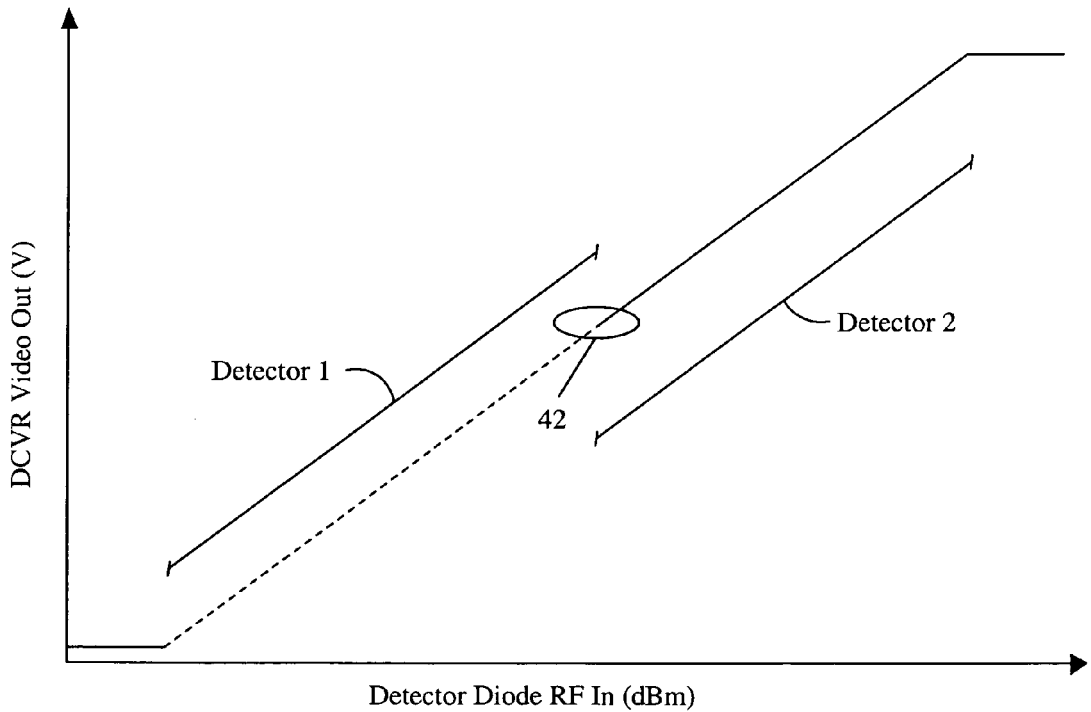
FIG. 4 is a graph illustrating an ideal logarithmic transfer function.
Figure 5:
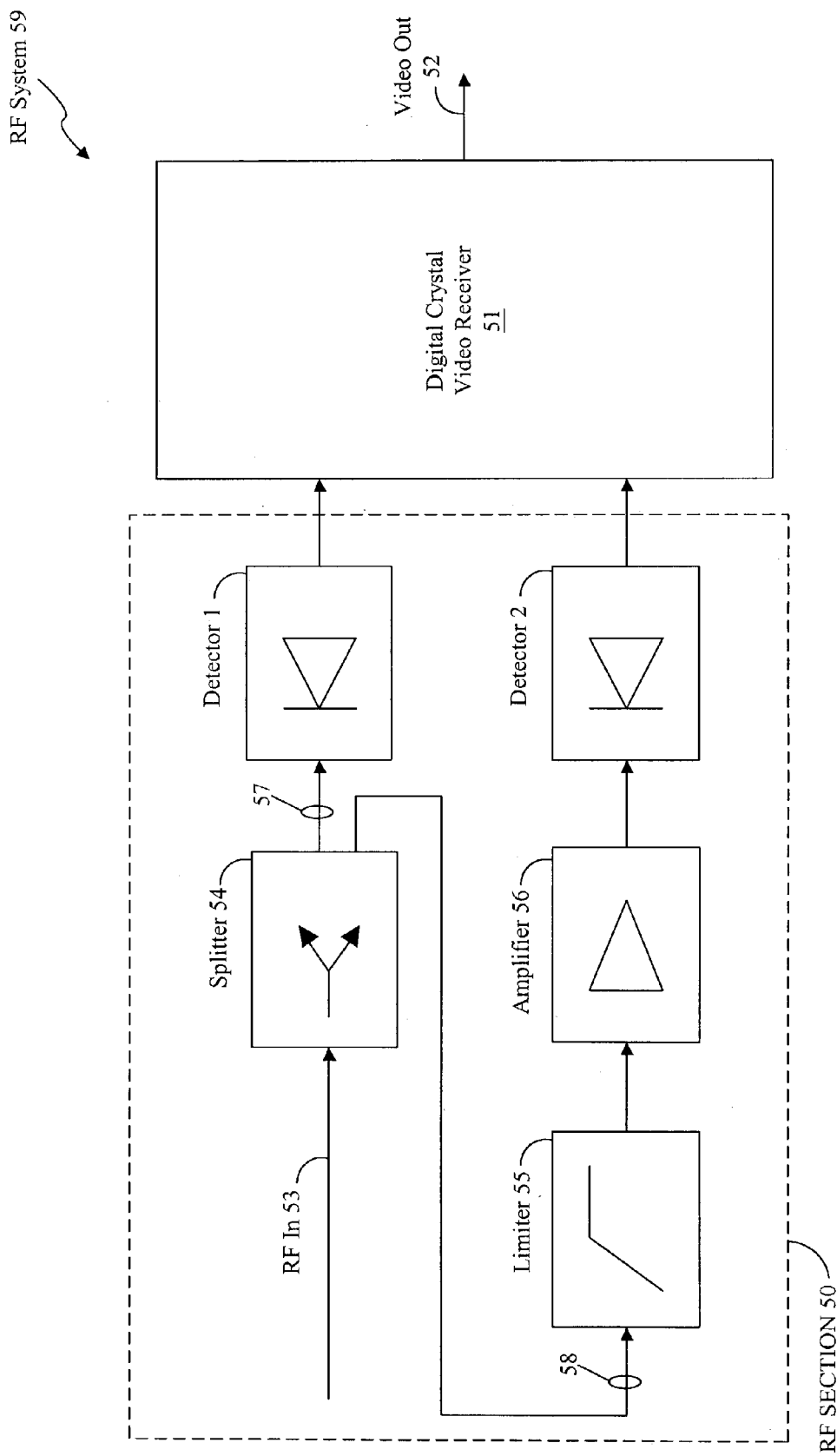
FIG. 5 illustrates an embodiment of an improved LVA.

Referring now in more detail to the figures in which reference numerals identify corresponding parts, FIG. 5 illustrates an example radio frequency (RF) system 59 that produces a logarithmic transfer function through digital circuit technologies. As indicated in FIG. 5, RF system 59 generally comprises a RF section 50 and a digital crystal video receiver 51. For example, the RF system 50 typically comprises a splitter 54, a limiter 55, an amplifier 56, and one or more detectors 1, 2. The RF system 59 receives a RF signal 53. The splitter 54 splits the RF signal 53 and produces a first 57 and second 58 RF signals. Detector 1 receives the first signal 57 and limiter 55 receives the second signal 58. Detector 1 senses the first signal 57 to determine whether the signal is in the first range of input signal power. The limiter 55 limits the power of the second signal 68 to a threshold level. The limiter 55 is used as an input protection for amplifier 56, which receives the signal from limiter 55. Amplifier 56 amplifies the signal and sends the amplified signal to detector 2, which senses the signal to determine whether the signal has a second range of input signal power. Detectors 1 and 2 send their respective first 57 and second 58 signals to the DCVR 51.

The DCVR 51 digitizes the signal received by the detectors 1, 2 and implements the logarithmic transfer function through digital circuit technologies as will be further discussed in the following figures. The DCVR 51 couples the logarithmic transfer function signal to video out 52.

Figure 7:
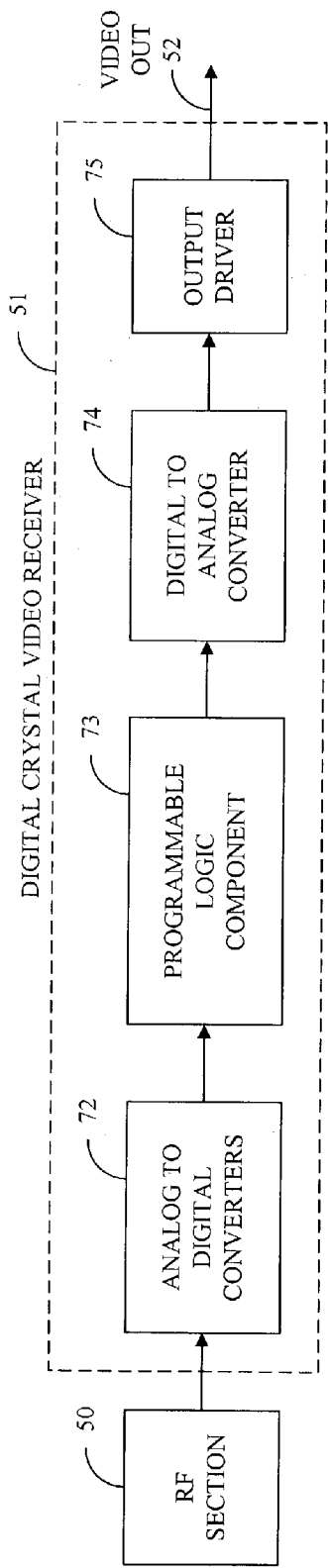
FIG. 7 is a block diagram illustrating an example architecture for DCVR.

FIG. 7 is a block diagram illustrating an example architecture for the digital crystal video receiver 51. As shown in FIG. 7, the DCVR 51 includes an analog-to-digital converter (ADC) 72, a programmable logic component (PLC) 73, digital-to-analog converter (DAC) 74 and an output driver 75. The RF section 50 detects the signal and sends the detected signal to ADC 72, where the signal is converted from an analog signal to a digital signal. PLC 73 receives the digital representation of the detected signal and determines the logarithmic transfer function of the detected signal. More specifically, PLC 73 generates a digital video signal that is a logarithmic transfer function of the detected signal. The digital video signal is then converted from a digital to analog signal via DAC 74. The converted analog video signal is sent to the output driver 75, which in turn amplifies the analog video signal before coupling the amplified signal to video output 62.

Figure 8:
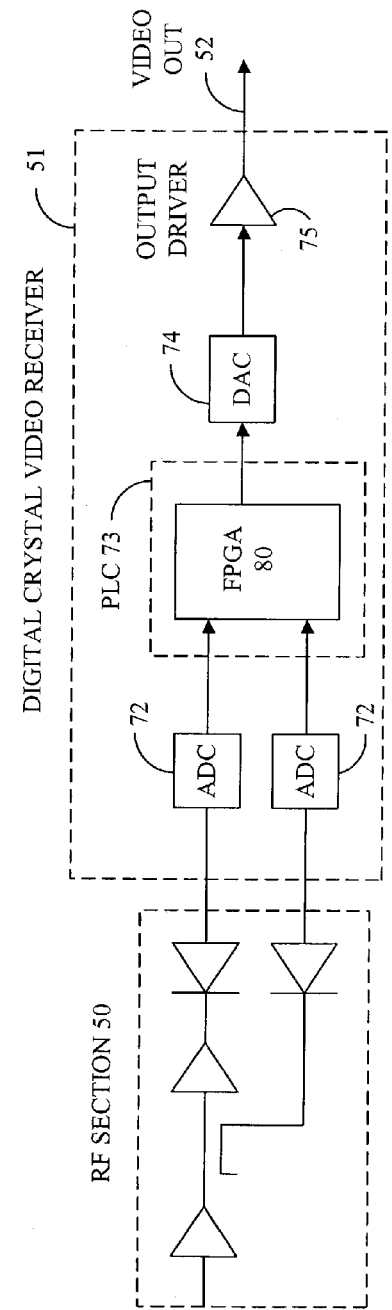
FIG. 8 is a block diagram illustrating an alternative example architecture for the DCVR.

FIG. 8 is a block diagram illustrating an example architecture implementing the PLC 73 using a field programmable gate array (FPGA) 80. It should be noted that the PLC 73 may also comprise a microprocessor, macroprocessor, and/or a combination of discrete logic components, etc.

Figure 9:
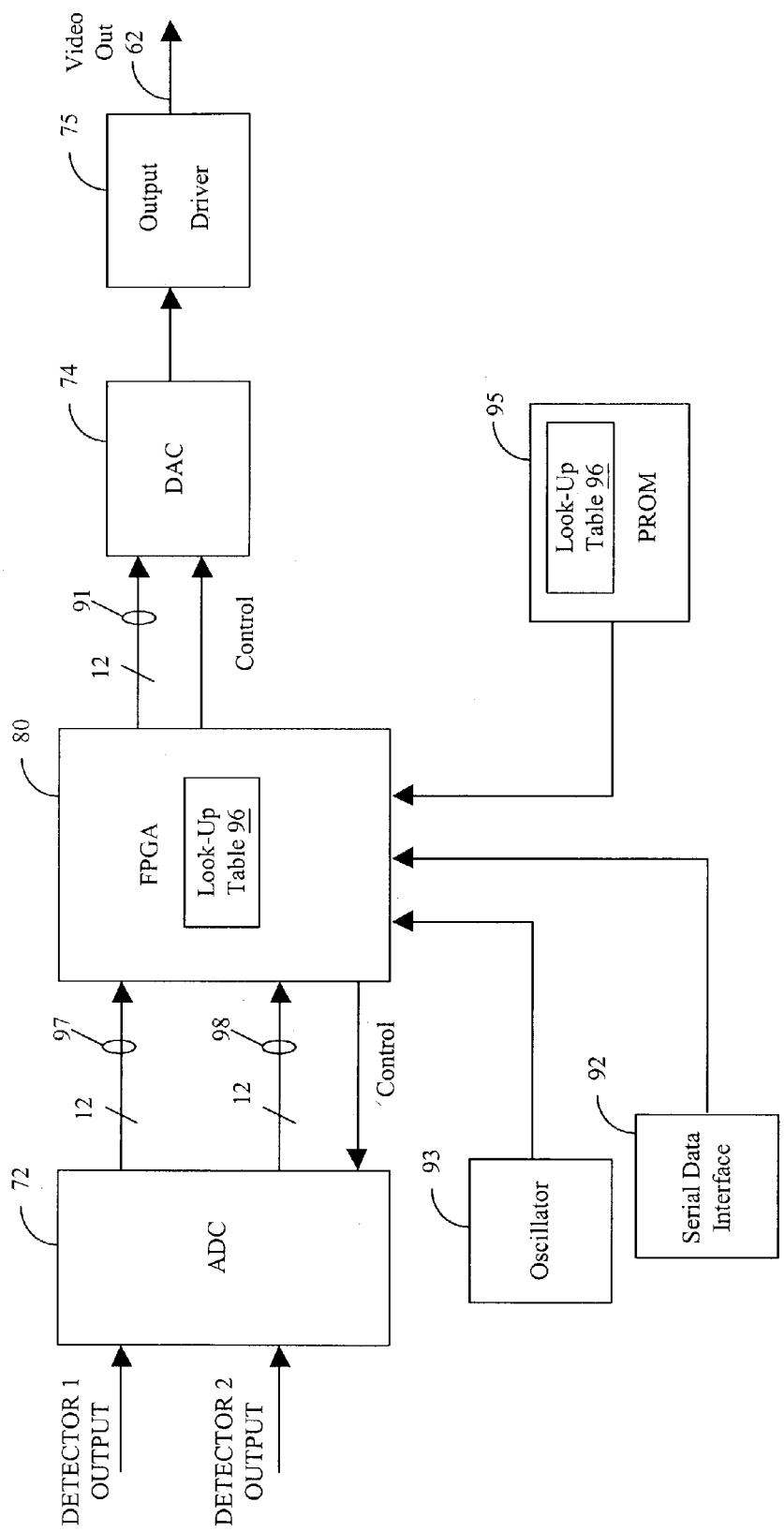
FIG. 9 is a block diagram further illustrating the DCVR of FIG. 8.

FIG. 9 is a more detailed block diagram of FIG. 8 illustrating an example architecture for the DCVR 51. Before the DCVR 51 is placed in operation, information is programmed into the DCVR such that, when in operation, the DCVR generates a linear logarithmic transfer function of the detected signal. For example, in FIG. 9, the PLC 73 is a FPGA 80 in which a look-up table 96 in prom 95 is programmed into the FPGA 80. The serial data interface 92 allows the user to alternatively program the field programmable array. The look-up table 96 may comprise of a set of information that enables the FPGA 80 to process a detected signal into a logarithmic transfer function signal. Oscillator 93 enables the FPGA 80 to operate at a certain speed (e.g. 40 MHz), particularly the rate of sampling data.

Although a FPGA 80 is used in accordance with a look-up table in FIG. 9, one skilled in the art would know other various methods to implement the functions of the look-up table. For example, the look-up table may be substituted with an instruction set that performs a mathematical calculation of the logarithmic transfer function of the detected signal.

The DCVR 51 converts the detected signals from detectors 1, 2 from an analog to digital signal via an ADC 72. The ADC 72 produces 12-bit digital signals 97, 98 that represent the analog signals from the detectors 1 and 2. The FPGA 80 determines the logarithmic transfer function of the detected signals from detectors 1 and 2 using information included in look-up table 96. Look-up table 96 enables the FPGA 80 to process or calculate the logarithmic transfer function of the detected signal. The FPGA 80 generates a digital video signal 91 that is the logarithmic transfer function of the detected signal. The FPGA 80 sends digital video signal 91 to DAC 74. In turn, DAC 74 converts the digital video signal 91 to an analog video signal. The analog video signal is then amplified by the output driver 75, which couples the amplified signal to video out 62.

Figure 10:
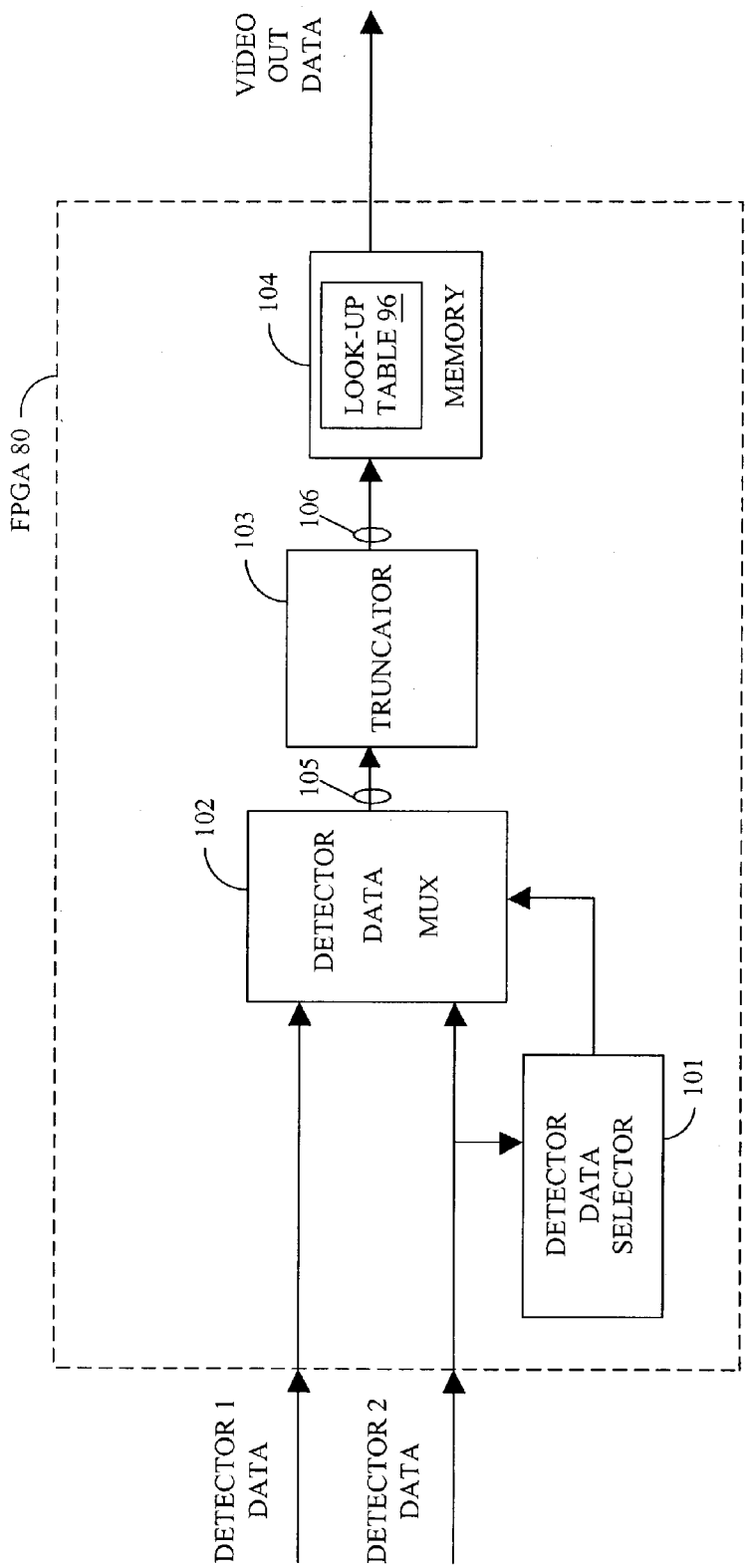
FIG. 10 is a block diagram illustrating an example architecture for the field programmable gate array of FIG. 9.

FIG. 10 is a block diagram illustrating an example architecture for the field programmable array 80. The FPGA 80 comprises a detector data selector 101, an detector data multiplexer 102, a truncator 103, and memory 104. The selector 101 senses the data of the detector 2 to determine whether to receive data from either detector 1 or 2. The selector 101 senses the voltage amplitude of the data and compares the voltage amplitude to a threshold level. For example, if the data from detector 2 has a voltage amplitude that is greater than the threshold level, selector 101 communicates to the multiplexer 102, to stop receiving data from the detector 1 and begin receiving data from the detector 2. The input signal switches from detector 1 to detector 2 resulting in a clean switch; thus, minimizes crossover distortion.

One skilled in the art would know other various methods to sense the data from detectors 1, 2 and switch receiving input signals from one detector to another. For example, the selector 101 may sense the voltage amplitude of the signal from the detector 1 and compare the voltage amplitude to a threshold level to determine whether to receive data from either detector 1 or 2.

The truncator 103 receives the selected data 105 from the multiplexer 102 and generates a logic-level output 106 that is readable by memory 104. Logic-level data 106 is fed to memory 104 where the memory bank implements the logarithmic transfer function via information received from look-up table 96. The addresses in memory 104 are stored with information that corresponds to the logarithmic transfer function of the detected signal. When in operation, the detected signal is converted into a digital signal, which represents an address in the memory of the FPGA 80. The FPGA 80 interprets the digital detected signal as an address in memory 104 and generates a desired response that over the entire range of input power results in a logarithmic transfer function signal. The digital logarithmic video data generated from the PLC 73 is passed to video out data.

Figure 6:
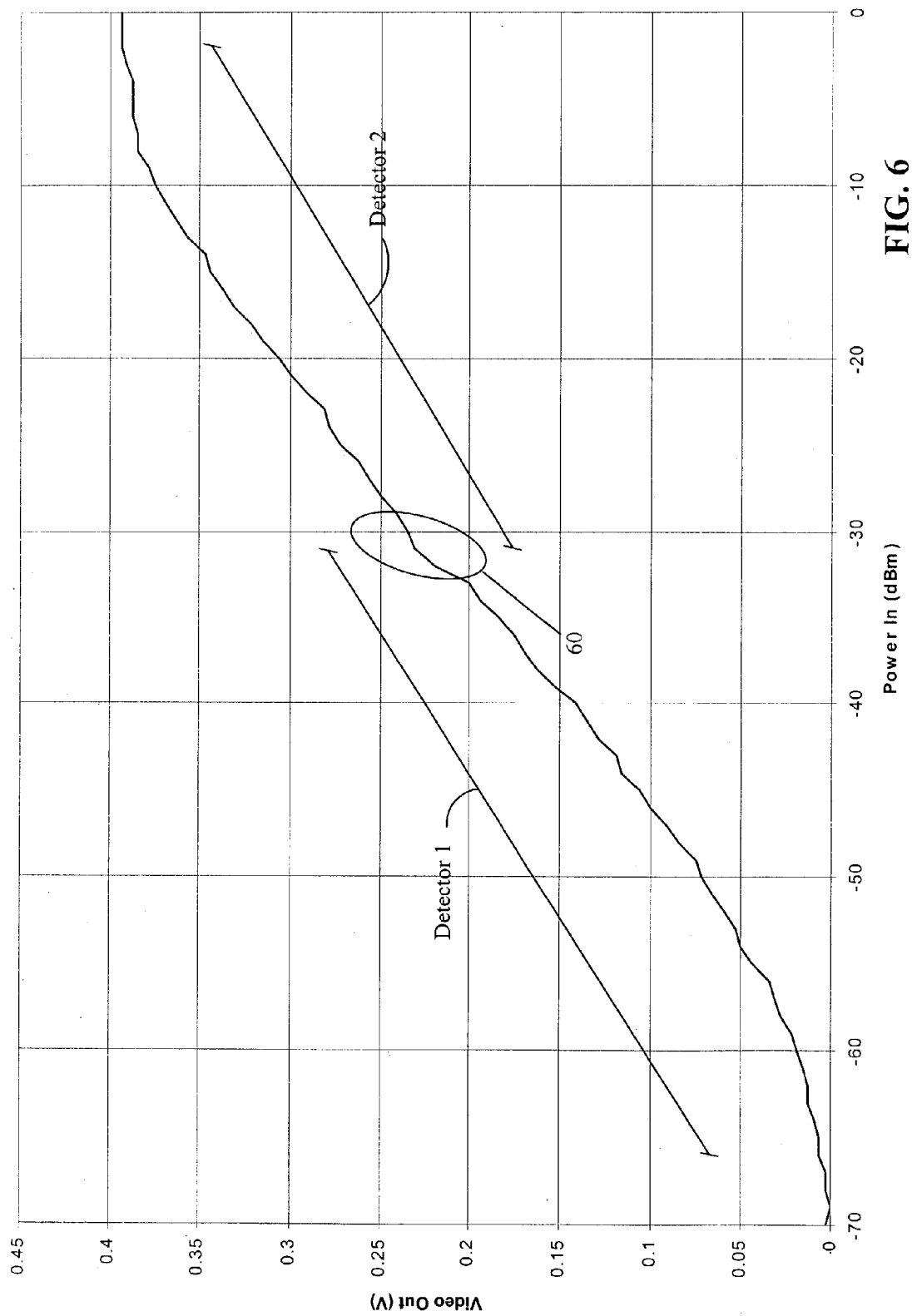
FIG. 6 is a graph of a linear response of a representative logarithmic transfer function realizable in a DCVR that includes an improved LVA.

The look-up table 96 processes the logarithmic transfer function of the data from detectors 1 and 2, including the logarithmic transfer function of the detected signals in the crossover region, that is, the region where the detector data multiplexer 102 switches from receiving detector 1 data to detector 2 data. As a result, the crossover region 60 of the DCVR 51 has minimum crossover distortion, as indicated in FIG. 6. For example, in FIG. 6, the signal power of detector 1 may be from −70 to −31 decibels above (or below) one milliwatt (dBm) and therefore, the DCVR generates a substantially linear response of a logarithmic transfer function from 0.00 to 0.23 Volts (V) over the signal power range of detector 1. It should be noted that the DCVR can be reprogrammed to generate a different slope. For example, the DCVR may generate a voltage from 0.00 to 0.50 V.

The signal power of detector 2 as shown in FIG. 6 may be from −31 to 0 dBm and the DCVR can be programmed to generate a substantially linear response of a logarithmic transfer function from 0.23 to 0.39 V over the signal power range of detector 2. As mentioned above, it should be noted that the DCVR can be reprogrammed to generate a different slope. For example, the DCVR may generate a voltage from 0.50 to 0.875 V.

FIG. 11 is another example embodiment of the FPGA 80 that includes a detector data selector 111, detector data multiplexer 112, memory 114, and truncator 113. Data from detector 1 and 2 is received by the multiplexer 102. The selector 101 senses the data from detector 2 and communicates to the multiplexer 102 to determine whether to receive data from either detector 1 or 2. Once the data is selected from either detector 1 or 2, the data is sent to memory 114 that processes a digital logarithmic video data for the selected data using information provided in look-up table 96. The digital logarithmic video data is sent to truncator 113, wherein truncator 113 generates a logic-level output before the digital logarithmic video data is sent to video out data.

It should be noted that a microprocessor, macroprocessor, discrete logic components, both individually or in combination, may implement and perform the functions of the selector 101, 111, multiplexer 102, 112, truncator 103, 113, and memory 104, 114.

FIG. 12 is a block diagram illustrating an example embodiment of the truncator 103, 113 shown in FIGS. 10 and 11. The truncator 103, 113 receives a signal from either the detector data multiplexer 102 of FIG. 10 or memory 114 of FIG. 11. The signal 110 is sent to a summer 122 and delay 121. Delay 121 delays the signal 120 a desired time before the signal is passed to summer 122. Summer 122 subtracts the delayed signal 123 to generate a logic-level output 124 and sends the signal to memory 104 or video out data. The truncator 103, 113 is further explained in FIG. 13.

Figure 13:
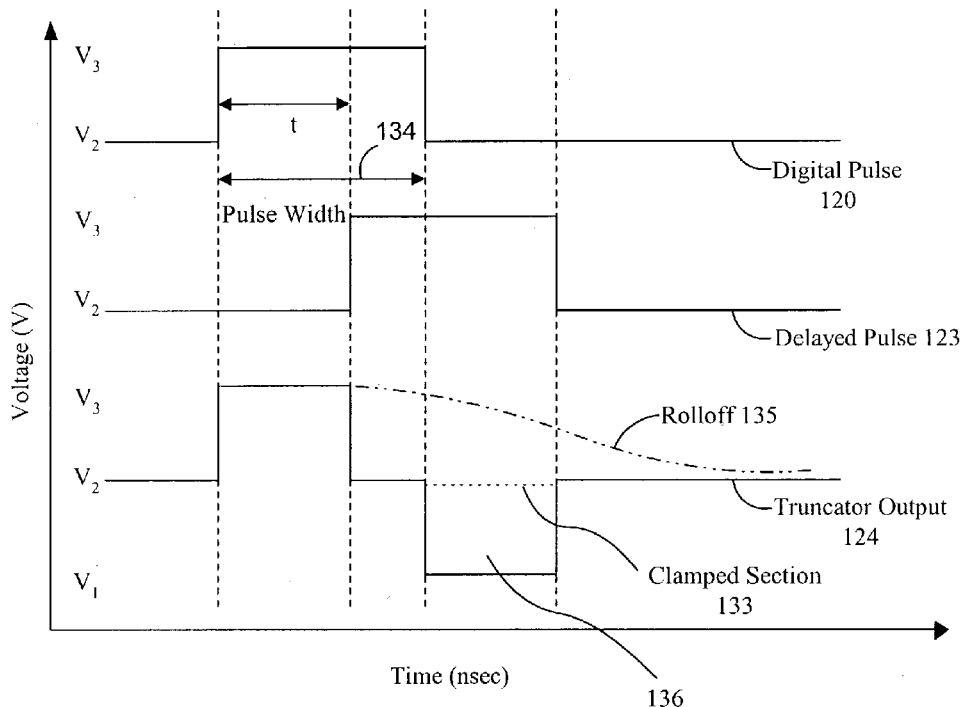
FIG. 13 is a composite plot including graphs of a digital pulse, a delayed pulse, and a truncator output.

FIG. 13 shows three graphs of the digital pulse 120, delay pulse 123, and truncator output 124 in real-time. The truncator 103, 113 receives the digital pulse 120 that has a pulse width 134. The delay component 121 of FIG. 12 postpones the signal to be received by the summer 122 of FIG. 12 by a period of time "t." The summer 122 subtracts the digital pulse 120 and delayed pulse 123 where the desired pulse width "t" is generated. Only a portion 136 of the transaction output 112 is clamped to a level $V_2$ shown as clamp section 133. The truncator 103, 113 generates a logic-level output having a desired width "t". Rolloff 135 illustrates an expected analog signal over time that results when an input voltage is abruptly reduced.

Figure 14:
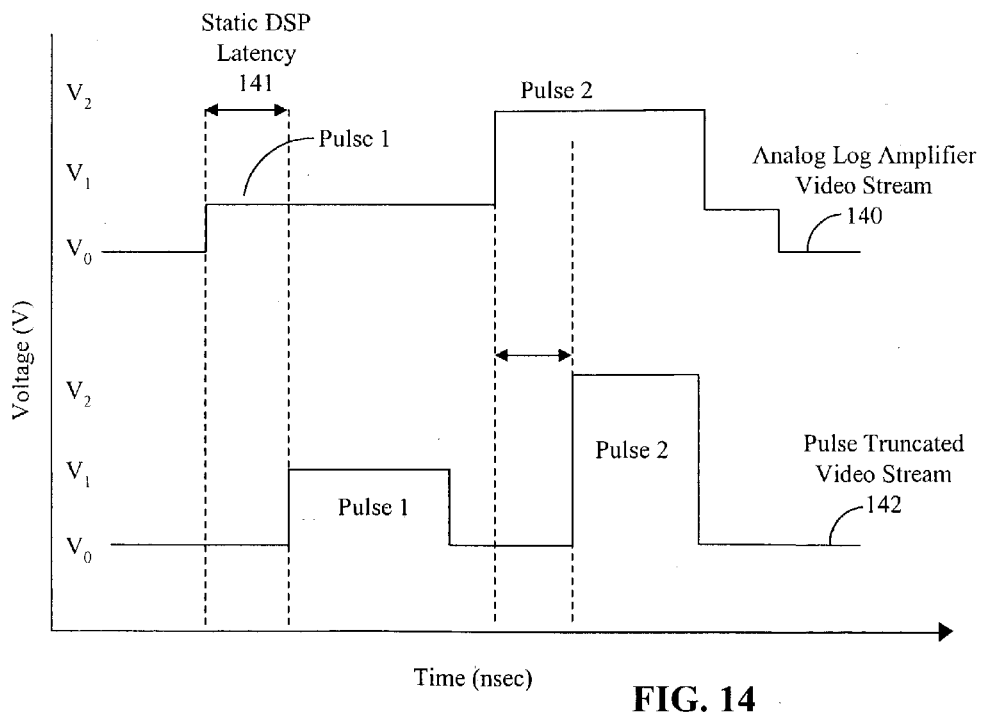
FIG. 14 illustrates an analog log amplifier video stream and a pulse video stream.

FIG. 14 shows a comparison of an analog log amplifier video stream 140 and a pulse truncated video stream 142 in real-time. A static digital signal processing latency 141 occurs because the processing of the signal in digital circuitry technology delays the signal output in view of the analog signal output. Both video streams 140, 142 have two pulses; however, the pulse truncated video stream 142 clearly shows the two pulses both beginning and ending at the $V_O$ level. In contrast, the analog log amplifier output video stream 140 stacks pulse 2 on top of pulse 1. As can be seen in FIG. 14, the pulse truncated video stream 142 produces two clean pulses that are desirable in the DCVR. The clean pulses are easily readable by memory 104 of FIG. 10 or easily converted to an analog signal via DAC 74 of FIGS. 7, 8, and 9.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included within the scope of the following claims.

What is claimed is:

1. A digital crystal video receiver comprising:
   an analog-to-digital converter; and
   a programmable logic component that determines the logarithmic transfer function of a plurality of signals, wherein the programmable logic component comprises a memory having one of a look-up table and an instruction set that enables the programmable logic component to process or calculate a signal that is logarithmically proportional to the signals, wherein the programmable logic component further comprises a multiplexer that enables one of the plurality of signals to be received by the programmable logic component.

2. The receiver as in claim 1, wherein the programmable logic component is one of a FPGA, microprocessor, macroprocesser, and combinations of discrete logic components.

3. The receiver as in claim 1, wherein the programmable logic component further comprises a selector that communicates with the multiplexer to select one of the plurality of signals received by the programmable logic component, wherein the selection of the plurality of signals provides a clean switch among the plurality of signals minimizing crossover distortion.

4. The receiver as in claim 3, wherein the selector operates by sensing the voltage amplitude of the signals and comparing the voltage amplitude to a threshold level.

5. The receiver as in claim 3, wherein the programmable logic component further comprises:
   a truncator that receives the selected signal from the multiplexer and produce a logic-level output of the selected signal; and
   a memory that receives the logic-level output from the truncator, the memory having one of a look-up table and an instruction set table that enables the programmable logic component to process or calculate a video signal that is logarithmically proportional to the selected signal.

6. The receiver as in claim 3, wherein the programmable logic component further comprises:
   a memory that receives the selected signal from the multiplexer, the memory having one of a look-up table and an instruction set that enables the programmable logic component to process or calculate a video signal that is logarithmically proportional to the selected signal; and
   a truncator that receives the video signal and produces a logic-level output of the video signal.

7. A method for determining the logarithmic transfer function of a signal using digital circuitry components, the method comprising:
   converting a plurality of analog signals to a plurality of digital signals;
   receiving the plurality of digital signals via a programmable logic component, wherein the programmable logic component comprises a multiplexer that enables one of the plurality of digital signals to be received by the programmable logic component; and
   determining the logarithmic transfer function of the plurality analog signals based on the plurality of digital signals via the programmable logic component,
   wherein determining the logarithmic transfer function of the plurality of analog signals based on the plurality of digital signals via the programmable logic component comprises processing or calculating a video signal that is logarithmically proportional to the plurality of analog signals via one of a look-up table and an instruction set.

8. The method as in claim 7, further comprising selecting one of the plurality of digital signals that provides a clean switch among the plurality of digital signals to minimize cross over distortion.

9. The method as in claim 8, wherein the selecting one of the plurality of digital signals comprises sensing the voltage amplitude of the digital signals and comparing the voltage amplitude to a threshold level.

10. The method as in claim 8 further comprising:
generating a logic-level output of the selected digital signal; and
determining the logarithmic transfer function of the selected digital signals with logic-level output via one of a look-up table and an instruction set.

11. The method as in claim 8, wherein determining the logarithmic transfer function of the plurality of analog signals based on the plurality of digital signals via the programmable logic component comprises:
determining the logarithmic transfer function of the selected digital signal via one of a look-up table and an instruction set;
generating a video signal representing the logarithmic transfer function of the selected digital signal; and
generating a logic level output of the video signal.

12. A digital crystal video receiver comprising:
means for converting a plurality of analog signals to a plurality of digital signals;
means for receiving the plurality of digital signals via a programmable logic component, wherein the programmable logic component comprises a multiplexer that enables one of the plurality of digital signals to be received by the programmable logic component; and
means for determining the logarithmic transfer function of the plurality of analog signals plurality of analog signals based on the plurality of digital signals via the programmable logic component, wherein means for determining the logarithmic transfer function of the plurality of analog signals comprises processing or calculating a video signal that is logarithmically proportional to the plurality of analog signals via one of a look-up table and an instruction set.

13. The receiver as in claim 12, further comprising means for selecting one of the plurality of digital signals and providing a clean switch among the plurality of digital signals to minimize crossover distortion.

14. The receiver as in claim 13, further comprising:
means for determining the logarithmic transfer function of the selected digital signal via one of a look-up table and an instruction set;
means for generating a video signal that is logarithmically proportional to the selected digital signal; and
means for generating a logic level output of the video signal.

15. The receiver as in claim 13, wherein means for selecting one of the plurality of digital signals further comprises means for sensing the amplitude voltage of the digital signals and comparing the voltage amplitude to a threshold level.

16. The receiver as in claim 13, further comprising:
means for generating a logic-level output of the selected digital signal; and
means for determining the logarithmic transfer function of the selected digital signal with a logic-level output via one of a look-up table and an instruction set.

17. The receiver as in claim 13, further comprising:
means for determining the logarithmic transfer function of the selected digital signal via one of a look-up table and an instruction set;
means for generating a video signal that is a logarithmic transfer function of the selected digital signal; and
means for generating a logarithmic output of the video signal.

* * * * *